No. 640,968.  
E. A. SPERRY.  
ELECTRIC VEHICLE.  
(Application filed Aug. 19, 1898.)  
(No Model.)

Patented Jan. 9, 1900.

2 Sheets—Sheet 1.

Witnesses  
Budd Gray.  
M. C. Prendergast

Inventor.  
Elmer A. Sperry.  
By Buckingham & Ewart,  
Attorneys.

No. 640,968. Patented Jan. 9, 1900.
E. A. SPERRY.
ELECTRIC VEHICLE.
(Application filed Aug. 19, 1898.)
(No Model.) 2 Sheets—Sheet 2.

Witnesses: Inventor.
F. Griswold Elmer A. Sperry.
Walter L. Upson. by Buckingham Ewart
Attys

UNITED STATES PATENT OFFICE.

ELMER A. SPERRY, OF CLEVELAND, OHIO, ASSIGNOR TO THE CLEVELAND MACHINE SCREW COMPANY, OF SAME PLACE.

ELECTRIC VEHICLE.

SPECIFICATION forming part of Letters Patent No. 640,968, dated January 9, 1900.

Application filed August 19, 1898. Serial No. 689,008. (No model.)

*To all whom it may concern:*

Be it known that I, ELMER A. SPERRY, a citizen of the United States, residing at Cleveland, in the county of Cuyahoga and State of Ohio, have invented certain new and useful Improvements in Electric Vehicles, of which the following is a specification.

My invention relates to an electric vehicle; and it consists in arrangement of the various parts and compartments of the body; and it consists, further, in various essential devices and accessories and their arrangement within the vehicle designed to render such vehicle complete in its details, as fully set forth in the present specification and claims and illustrated in the accompanying drawings, in which—

Figure 1:
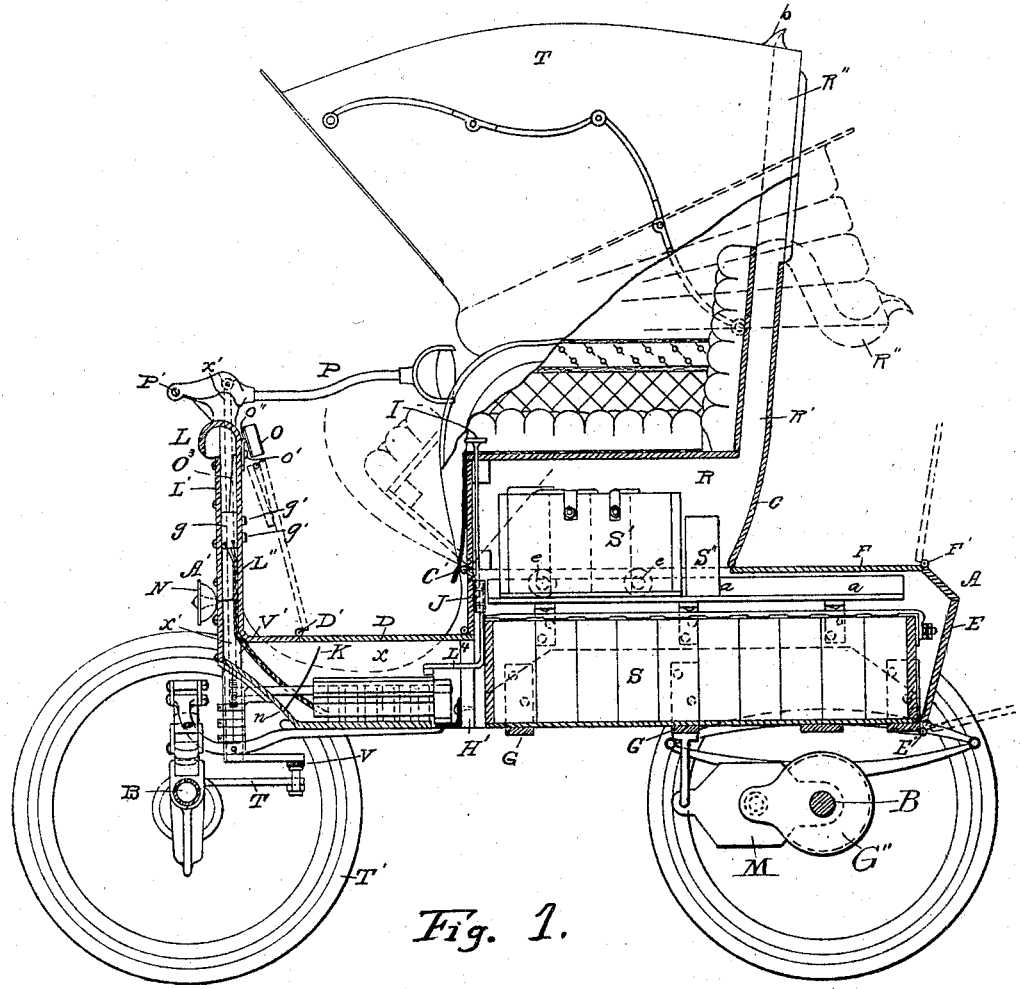
Figure 2:
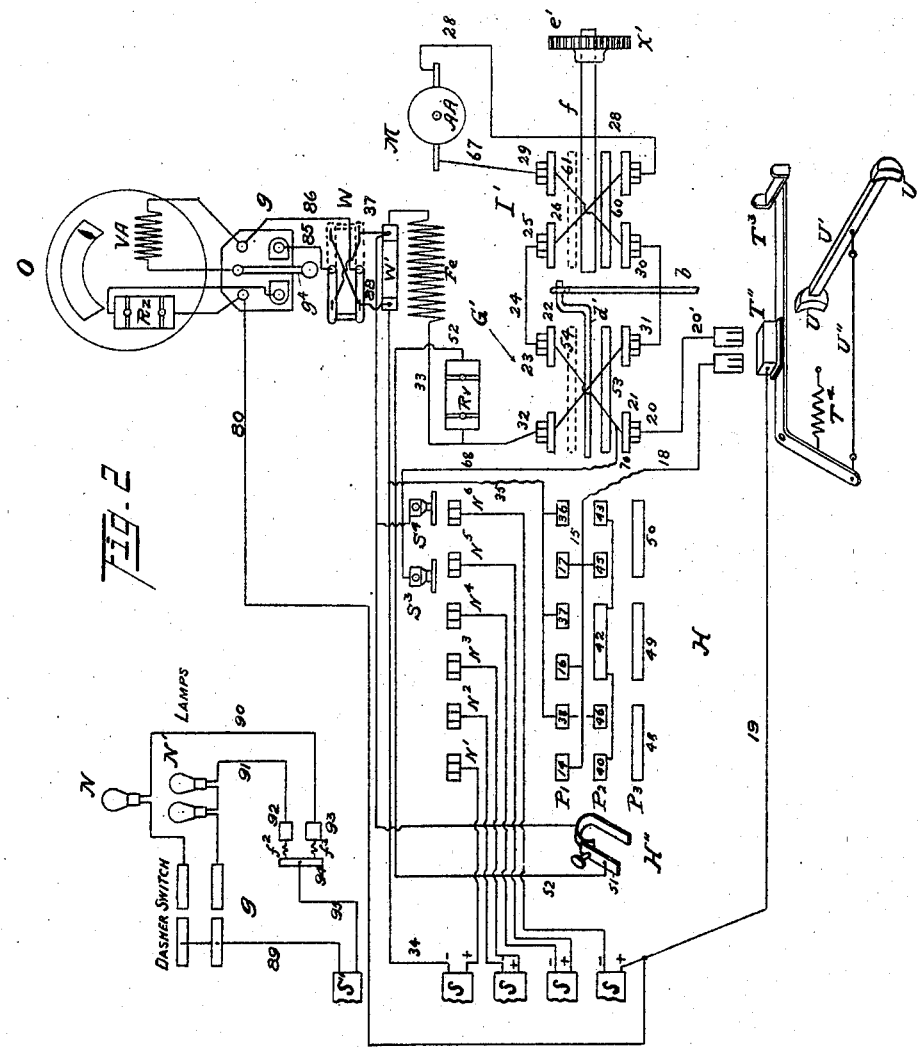

Figure 1 represents a longitudinal sectional view of the carriage embodying the improvements. Fig. 2 illustrates the electrical circuits, switches, and controller arrangements of the carriage.

The vehicle-body A is supported suitably upon the axles B B and wheels, as shown. The body is furnished with a dasher A', and a seat C may be secured to the body by hinge C'. The floor of the body is illustrated at D, and may be hinged at D'. The vehicle-body is further supplied with a swinging end-gate E, which may be hinged at E', and an upper panel of the rear extension of the body A, shown at F, and may be hinged at F'. Suitable cross-pieces connect the two sides of the body, (illustrated by G G,) on which the storage batteries or sets of storage batteries S rest. Above these is another pair of storage batteries S' and S" within the space formed by the risers R and back panel C of the seat. These batteries or some of them may be characterized by the peculiarity that they generate hydrogen gas and may form a dangerous and explosive mixture with atmospheric air. These batteries rest upon suitable projections from the body, (shown at $a\,a$,) and I prefer to extend it rearwardly, as shown, for the purpose of sliding the battery S' back after the seat has been tipped, as shown in dotted lines. The panel F has been raised to position (also shown in dotted lines,) and batteries S" removed. A ventilating-passage R' is shown as extending upwardly from the battery-compartment, preferably rearwardly and away from the switch-compartment, and may receive a still further upward extension by R" R" under the top $T^5$ of the vehicle. The dotted line shows the position of this compartment when the top is in a folded position. A rain-guard $b$ is placed for suitably protecting the top of the passage R".

It will be seen that the carriage is divided into separate compartments by the partition H'. The contents of the rear compartment having been described, that of the forward compartment will be seen to contain the current-controlling switches and will be seen to be lower and forward of the battery-compartment.

A lever-arm $L^4$, coöperating with the moving parts, for instance, of the switches, is furnished with a handle I near the cushions of the seat, and a coupling and uncoupling device near the hinge C' is shown at J. This is of such a character that when the seat is tipped forward the handle I may be disconnected from the lever L, and thereby prevented from bending or otherwise being injured by the forward tipping of the seat upon the hinge C'.

It is well known that electric storage batteries require inspection frequently, and in the construction of cells, which are preferred to use, this inspection should be possible at the top of each cell constituting the battery. It will readily be seen that by tipping the seat forward the upper cells are at once brought to view and by opening the panel F the rear half or more of the cells upon the lower deck. Now by sliding the cells S' and S" backward the forward half of the cells in the lower compartment are readily brought to view and inspected.

The rollers $e\,e$ may be used to facilitate the moving of the batteries S'. The battery S" is light and easily removed.

It will be noted that the ventilation is away from the compartment X, containing the current-controlling switches and controller H.

It will readily be understood that certain communications are of necessity made through the floor D, necessitating incisions in such floor or joints—such, for instance, as that shown at D'—and I prefer to use under such joints a rain or moisture guard K, which will deflect such moisture or leakage as may come through the joints or incisions and carry same out of the cavity lower down—for instance, at n.

Passing now to the hollow dasher A' it will be understood that the same has considerable thickness fore and aft, sufficient, in fact, to accommodate the various devices now to be described, which are inclosed within the space preferably out of view. This dasher may be made in various ways, but I prefer to make it of a plurality of panels—wood, leather, or metal preferred—one at L' being the forward one and the back one L", which really serves as a switchboard for a number of the electrical devices in the carriage. For instance, the lamps of the carriage shown at N N' are controlled, together with other electrical devices, from the switch g, which is within the hollow dasher, and the push-buttons or other manipulating device protruding through the back panel or wall may be seen at $g'$ $g'$—one for the lamps—and another may operate the indicator-switch $g^4$, Fig. 2. Again, the meter or current-indicator O is supported by the dasher preferably with top tilted forward, for convenience, and preferably placed so as to be easily removed. This is accomplished through the stationary terminal O' and the coöperating detachable meter-electrodes O". Thus by simply slipping the terminals of the meter behind the hooked terminals of the dasher the meter may be inserted and withdrawn with facility. Electrical connections to the indicator-terminals are seen at $O^3$ interior to the dasher. Again, the controlling-handle P is supported by the dasher at L and pivoted at P' and connected with the controller by a rod X' X', connected to the controller, as shown, and passing also through the hollow dasher of the vehicle. Again, the steering-handle P is connected with the steering-arm T of the steering-wheel T' by a connection shown at V and rising up through the dasher, (indicated by V'.) It will be thus seen that the electrical and mechanical connections which pass up inside the hollow dasher are out of view, and yet are easily accessible through the removable panel L'.

Passing now to the function of the batteries S", Figs. 1 and 2, it will be readily understood that the main generator of the vehicle, consisting of batteries S and S', are of large voltage and, moreover, they are frequently cut up and the parts coupled in multiple and in series, as seen in Fig. 2, rendering it impossible to use all for lighting purposes. Heretofore sections of these batteries have been used; but this tends to disturb the balance between the various parts, and I prefer to employ a separate battery entirely for the operation of the lamps, which need not be of large voltage nor of great size nor weight. This is seen back of the battery S' and indicated by S", it having no other function than simply supplying the lamp-circuit, as seen in Fig. 2.

The system of control or arrangement of electrical circuits of the vehicle is shown in diagram in Fig. 2. It will be seen that the electricity is generated by separate units S S S S, each of which may represent a group of generators, the positive and negative terminals of which are coupled, as shown, to the various circuit-manipulating devices. Their function and relation remain now to be pointed out in detail. To the right is observed the gear or segment $e'$, by means of which the controller-shaft $f$ is manipulated. On this shaft is mounted the reversing-switch I' and the controller H, the controller having three active positions on the power side, (indicated by P' $P^2$ $P^3$.) The brushes coöperating with these various contacts are illustrated by N' to $N^6$, respectively. The reversing-switch G' is seen mounted upon its shaft $d'$ and operated by the crank and link $b$. On the two reversing-switches I' and G' these contacts are shown with their electrical connections. Leading from the reversing-switch G' and also the controller H are flexible wires, (indicated by the waving lines,) which are numbered 18, 35, and 68 in the following description:

When the controller is so turned that the brushes N engage the row P' of contacts, it will be seen that the current flows through the motor, as follows: Coming from each of the generators S it reaches brush N', contact 14, wire 15, brush $N^3$, contact 16, wire 15, brush $N^5$, contact 17, wire 15, flexible wire 18, and from the last generator by wire 19, switch T", wire 20', to brush 20. Suppose now that the reversing-switch be in the position shown in Fig. 2, the current will enter contact 21, contact 22, brush 23, wire 24, brush 25, contact 26, contact and brush to wire 28, through the armature A A of the motor to brush 29, to brush 30, 31, and 32, wire 33, field F$e$, wire 34 to the negative of the first battery and wire 35 (part of which is flexible) to contacts 36, 37, and 38, to brush $N^2$, returning the current to the second generator, brush $N^4$, returning the current to third generator and brush $N^6$, returning current to fourth generator, which will thus be seen to have been coupled to the motor in parallel.

It will readily be understood that the relation between the reversing-switch I' and the controller H is fixed, and the direction of the current through it is always as indicated in any of the three power positions.

Taking now the second power position obtained by turning the controller in such a way that the brushes N' to $N^6$ rest upon the second row of contacts—viz., $P^2$—we notice that the current generated by the first generator N arrives at brush N', contact 40, and the current coming from the second generator arrives at $N^3$, contact 42, passes back through brushes $N^4$ and $N^6$, the latter by way of contact 43 and wire 44 to the lower pair of generators, from whence it flows to the brush $N^5$, contact 17, wire 15, and thence, as before, by flexible wire 18, joined by current from the last generator, passing wire 19, switch $T'''$, and wire $20'$ to contact 20, and thence through the motor or motors back to the negative terminals of the first two generators, by wires 34 and 35, from contact 46, brush $N^2$, to the negative of the second generator N, at which point the circuit is complete. Thus it will be seen in this position the motor or motors receive current from two of the generators in multiple, coupled in series with two other of the generators.

When the controller is turned to the position $P^3$, the generators are then all in series, the current passing as follows: from the positive of the first generator to brush $N'$, contact 48, brush $N^2$; second generator, brush $N^3$, contact 49, brush $N^4$; third generator, brush $N^5$, contact 50, brush $N^6$; fourth generator, wire 19, switch $T'''$, wire $20'$, brush 20 to motor and fields and back to the first generator by wire 34, exactly as above pointed out in reference to the two other power positions. Contact $H''$ is carried by the same support that carries the other contacts. Thus it will be noticed that while in this last power position only the stationary contact $H''$ is brought into position, so that contact 51 may be forced into electrical connection therewith, whereupon the current from wire 33 will be diverted from the field through the variable resistance $Rv$, as shown, thus weakening the field or fields $Fe$ and giving a higher rotative speed to the armature or armatures A A. Furthermore, it will be seen that if the reversing-switch $I'$ is so operated that the long contacts 53 and 54 are brought under the brushes 20, 23, 31, and 32 in this case the current arriving at brush 20 will pass over on contact 53 to brush 31, and therefore pass the armature in the directions opposite that just described and not resume the original direction until it again arrives at brush 32, thus giving a complete reversing action to the motor or motors M connected.

It will thus be seen that the motor is a reversible motor and when reversed while in motion may become a generator, the currents acting through circuits described in the following specification.

The current from the batteries in passing to the machine are made to pass through the switch $T'''$, which is operated by a lever or pedal $T^3$ and retracted by spring $T^4$, operating the brake-beam $U'$ by means of link $U'''$ for purpose of applying the mechanical brakes U U. These may be of any type.

Returning now to the switch $T'''$, it will be noticed that it is a three-point switch and is coupled to contact 20 by wire $20'$. Wire 18 couples one contact with certain of the controller-contacts used in the parallel and series parallel arrangement of generators S, and the wire 19 serves to bring the third contact into electrical communication with the generators or batteries S. The switch $T'''$, which operates when the mechanical brake is actuated, performs three important functions.

First. That of opening the main circuit when the mechanical brake is applied.

Second. The leads of the switch are so arranged that it is inserted with the charging-terminal by wire $20'$ and brush 20, contact 70, wire 68, terminal $S^3$, and thus may be used as a charging-switch to open and close the charging-circuit, and thus control the charging-current.

Third. The three-pointed feature already referred to permits the isolation of the parallel and series parallel contacts from the controller when disconnecting the battery from the main circuit. This is for purpose of rendering the circuit open at all positions of the controller when the switch T is open-circuited.

Referring now to the meter O, it may be stated that any form of instrument may be employed, but a volt-ammeter is preferred. This is provided with a meter-operating coil $VA$ and also with a resistance $Rz$. These are connected by suitable wires to the transfer-switch $g^4$. The switch is also connected by wires 80, 85, and 86 to the positive end of the last battery or generator S and also to the reversing-switch W, and thence by wires 37 and 88 to the two ends of the ammeter-shunt (marked $W'$.) To the far end of the shunt will be seen connected the other charging-terminal $S^4$, so that the current in entering the negative end of the battery S by wire 34 will be compelled to pass through the shunt, and therefore register on the ammeter. It will be readily understood that any ammeter may be used instead of the one with the shunt, as shown, for indicating the current. The advantage, however, of the peculiar kind of instrument illustrated is that in a single instrument while operating the switch $g^4$ either the amperes or volts may be read and by employing in conjunction with the ammeter the reversing-switch W the charging-current may be read, as well as the currents operating the machine.

The lamp-circuits, Fig. 2, are supplied from battery $S''$ by wire 89, switch $g$, and the circuits are completed through the wires 90 and 91, passing through the dasher to the terminals 92 and 93 by fuses $f^2$ and $f^3$ to the bar 94, wire 95 to the battery $S''$.

It will readily be understood that while it is designed to use the above parts in the relation shown yet some may be used without the others, and the invention extends to such use.

It will furthermore be readily understood that the construction and arrangement may be varied without departing from the spirit of the invention.

Having thus described my invention, what I claim, and desire to secure by Letters Patent, is—

1. In an electric vehicle, a vehicle-body, a seat on the upper part of the body, in combination with a plurality of battery-supports superimposed within the body and a plurality of groups of batteries upon such supports.

2. In an electric vehicle, a vehicle-body, a seat on the upper part of the body, a plurality of battery-supports superimposed within the body, a plurality of groups of batteries upon such supports, in combination with panel-like risers for the seat.

3. In an electric vehicle, a vehicle-body, a seat on the upper part of the body, in combination with a plurality of battery-supports, superimposed within the body, a group of batteries on the lower support and a group half the size of the former group upon the upper support, substantially for the purpose specified.

4. In an electric vehicle, a vehicle-body, a seat on the upper part of the body, a plurality of battery-supports superimposed within the body, a group of batteries on the lower support, a group half the size of the former group upon the upper support, in combination with means for sliding the batteries which are upon the upper support longitudinally to the body.

5. In an electric vehicle, a vehicle-body, a seat on the upper part of the body, in combination with a plurality of battery-supports, within the body, a plurality of groups of batteries upon such supports, a protrusion of the body back of the seat and a removable top for the protrusion.

6. In an electric vehicle, a vehicle-body, a seat on the upper part of the body, in combination with a plurality of battery-supports within the body, a plurality of groups of batteries upon such supports, a protrusion of the body back of the seat, a removable top for the protrusion and hinges for the seat, located upon the forward part of the seat.

7. In an electric vehicle, a vehicle-body, a seat on the upper part of the body, in combination with a plurality of battery-supports within the body, a plurality of groups of batteries upon such supports, a protrusion of the body back of the seat, a removable top for the protrusion and a swinging end-gate for the protrusion.

8. In an electric vehicle, a vehicle-body, an inclosure within the body, electrical storage batteries characterized by the ability to develop hydrogen gas and current-controlling switches within such inclosure, in combination with a separating-partition between the switches and the batteries.

9. In an electric vehicle, a vehicle-body, an inclosure within the body, electrical storage batteries within the upper part of the inclosure, characterized by the ability to develop hydrogen gas, and current-controlling switches within the lower part of such inclosure, in combination with a separating-partition between the switches and the battery.

10. In an electric vehicle, a vehicle-body, an inclosure within the body, electrical storage batteries in the back part of the inclosure, characterized by the ability to develop hydrogen gas, and current-controlling switches within the forward part of the inclosure, in combination with a separating-partition between the switches and the batteries.

11. In an electric vehicle, a vehicle-body, an inclosure within the body, electrical storage batteries, characterized by the ability to develop hydrogen gas, current-controlling switches within such inclosure, in combination with a separating-partition between the switches and the batteries and means for ventilating the battery-compartment upwardly from the top thereof.

12. In an electric vehicle, a vehicle-body, an inclosure within the body, electrical storage batteries, characterized by the ability to develop hydrogen gas, current-controlling switches within such inclosure, in combination with a separating-partition between the switches and the batteries and means for ventilating the battery-compartment upwardly and backwardly from the top of the batteries.

13. In an electric vehicle, a vehicle-body, an inclosure within the body, electrical storage batteries, characterized by the ability to develop hydrogen gas, current-controlling switches within such inclosure, in combination with a separating-partition between the switches and the batteries and means for ventilating the compartment containing the batteries in a direction away from said partition.

14. In an electric vehicle, a vehicle-body, having a plurality of independent compartments within the body, in combination with electrical storage batteries in one of the compartments, current-controlling switches in another and means for ventilation of the battery-compartment upwardly from the top of the batteries, consisting of a passage formed by a false-seat wall.

15. In an electric vehicle, a vehicle-body, having a plurality of independent compartments within the body, in combination with electrical storage batteries in one of the compartments, current-controlling switches in another and means for ventilation of the battery-compartments upwardly from the top of the batteries consisting of a passage formed by a false-seat wall, and an extension to the passage within the vehicle-top, substantially as described.

16. In an electric vehicle, a vehicle-body, having a plurality of compartments within the body, a vertical seat-riser at the front of the seat and a vertical partition between the compartments, practically in line with the said seat-riser.

17. In an electric vehicle, a vehicle-body, having a plurality of compartments within the body, a vertical seat-riser at the front of the seat, a vertical partition between the compartments, practically in line with the said seat-riser, in combination with a hinged floor for the vehicle-body, constituting the upper wall of the said forward compartment.

18. In a vehicle, a vehicle-body, a hollow dasher for the body, having a wall or panel facing the seat, an electrical indicator supported on the said wall of the dasher, an electric generator within the body and electrical connections coupling the generator and the indicator, extending within the dasher, a switch for the connections and means for supporting the said conductors and switch upon the said wall.

19. In a vehicle, a vehicle-body, a dasher for the body, having considerable thickness longitudinally, steering-gear for the vehicle, a steering-handle above the dasher, operating connections extending through and hidden within the dasher, means for connecting the steering-gear to the handle, an indicator also supported upon the dasher and electrical connections within the dasher, occupying the space with the said operating connections substantially as specified.

20. In a vehicle, a vehicle-body, a dasher for the body, having considerable thickness longitudinally, steering-gear for the vehicle, a steering-handle above the dasher, operating connections extending through and hidden within the dasher, means for connecting the steering-gear to the handle, an electrical indicator and electrical switch, also supported upon the dasher, and electrical connections within the dasher, occupying the space with the said operating connections, substantially as specified.

21. In a vehicle, a vehicle-body, a floor for the body, a compartment for the electrical switches under the floor, a joint or other incision in such floor and means under the joint or incision for shielding the contents of the compartment from moisture coming through such joint or incision.

22. In a vehicle, a vehicle-body, a dasher for the body, having considerable thickness longitudinally, steering-gear for the vehicle under the dasher, a steering-handle above the dasher, operating connections extending through and hidden within the dasher, and means for connecting the steering-gear to the handle.

23. In a vehicle, a vehicle-body, a dasher for the body, having considerable thickness longitudinally, a controller for the vehicle under the dasher, a controller-handle above the dasher, operating connections extending through and hidden within the dasher, and means for connecting the steering-gear to the handle.

24. In a vehicle, a vehicle-body, a hollow dasher for the body, a compartment below the dasher, communicating with the cavity within the dasher, a controller within the compartment, operating connections for the controller, extending through the dasher and a handled controlling-lever supported by the dasher.

25. In a vehicle, a vehicle-body, a hollow dasher for the body, having a wall or panel facing the seat, an electric-circuit-controlling device within the dasher and an operating connection consisting of the usual handle extending to the outer surface of the panel.

26. In a vehicle, a vehicle-body, a hollow dasher for the body, having a wall or panel facing the seat, an electric-circuit-controlling device within the dasher, an operating-handle extending to the outer surface of the panel and electrical conductors extending upward within the dasher to the device.

27. In a vehicle, a vehicle-body, a hollow dasher for the body, having a wall or panel facing the seat, an electric-circuit-controlling device within the dasher, an operating-handle as $g'$ extending to the outer surface of the panel, an electric generator within the body and connections from the generator to the device, extending within the dasher.

28. In a vehicle, a vehicle-body, a hollow dasher for the body, having a wall or panel facing the seat, an electrical indicator supported on the said wall of the dasher, an electric generator within the body, electrical connections coupling the generator and the indicator, extending within the dasher, means for supporting said conductors upon the said wall and an additional removable wall for the dasher.

29. In a vehicle, a vehicle-body, a hollow dasher for the body, an electric generator within the body, electric lamps for the vehicle, a circuit-controlling device within the dasher, an operating-handle, extending to the outer surface of the dasher and an electric connection from the device to both generator and lamp.

30. In an electric vehicle, a vehicle-body, an electric generator, an electric translating device, forming a part of the vehicle, an electric lamp for the vehicle and an independent generator for the lamp.

31. In an electric vehicle, a vehicle-body, a hollow dasher for the body, an electric generator, an electric translating device, forming a part of the vehicle, an electric controlling device within the hollow dasher and manipulating connections extending through one of the walls of the dasher.

32. In an electric vehicle, a vehicle-body, a hollow dasher for the body, an electric generator, an electric translating device, forming a part of the vehicle, an electric controlling device within the hollow dasher and manipulating connections extending through the back wall of the dasher and a removable front wall for the dasher.

33. In an electric vehicle, a vehicle-body, a hollow dasher for the body, an electric generator, an electric translating device, forming a part of the vehicle, an electric indicator upon the outside of the dasher, terminals for the indicator upon the dasher, electric conductors within the dasher for the terminals and a detachable support for the indicator.

34. In an electric vehicle, a vehicle-body, a hollow dasher for the body, an electric generator, an electric translating device, forming a part of the vehicle, an electric indicator upon the outside of the dasher, terminals for
5 the indicator upon the dasher, electric conductors within the dasher for the terminals, a detachable support for the indicator, consisting of coöperating electric terminals upon the indicator.

ELMER A. SPERRY.

Witnesses:
  W. S. ROGERS,
  M. C. PRENDERGAST.